United States Patent [19]

Chane-Ching et al.

[11] Patent Number: 5,376,305
[45] Date of Patent: Dec. 27, 1994

[54] PREPARING STORAGE STABLE AQUEOUS COLLOIDAL DISPERSIONS OF CERIUM (IV) VALUES

[75] Inventors: Jean-Yves Chane-Ching; Jean-Yves Dumousseau; Patrick Dupuis, all of Paris, France

[73] Assignee: Rhone-Poulenc Specialites Chimiques, Courbevoie, France

[21] Appl. No.: 885,235

[22] Filed: May 20, 1992

Related U.S. Application Data

[63] Continuation of Ser. No. 342,680, Apr. 25, 1989, abandoned, which is a continuation of Ser. No. 876,449, Jun. 20, 1986, abandoned.

[30] Foreign Application Priority Data

Jun. 20, 1985 [FR] France ................................ 85 09372

[51] Int. Cl.$^5$ .............................................. B01J 13/00
[52] U.S. Cl. ................................................ 252/313.1
[58] Field of Search ...................................... 252/313.1

[56] References Cited

U.S. PATENT DOCUMENTS

| | | | |
|---|---|---|---|
| 2,364,613 | 12/1944 | Ballard et al. | 423/21.1 |
| 3,024,199 | 3/1962 | Pasfield | 252/313.1 |
| 3,148,151 | 9/1964 | Fitch et al. | 252/313.1 |
| 3,359,213 | 12/1967 | Clearfield | 252/313.1 |
| 3,442,817 | 5/1969 | Luebke | 252/313.1 |
| 3,645,910 | 2/1972 | Woodhead | 252/313.1 |
| 3,761,571 | 9/1973 | Woodhead | 423/263 |
| 4,211,667 | 7/1980 | Yamada et al. | 252/313.1 |
| 4,231,893 | 11/1980 | Woodhead | 252/313.1 |
| 4,244,835 | 1/1981 | Block | 252/313.1 |
| 4,356,106 | 10/1982 | Woodhead et al. | 252/313.1 |
| 4,576,921 | 3/1986 | Lane | 252/313.1 |
| 4,606,847 | 8/1986 | Woodhead | 252/313.1 |

OTHER PUBLICATIONS

Hawley, *The Condensed Chemical Dictionary*, 9th Ed., p. 830, Van Nostrand Reinhold Co. (1977) New York.

*Primary Examiner*—Edward A. Miller
*Attorney, Agent, or Firm*—Burns, Doane, Swecker & Mathis

[57] ABSTRACT

Storage-stable sols are comprised of a colloidal dispersion of Ce (IV) values in an aqueous medium, and optionally colloidal particulates of a cation of a metal M, with said colloidal dispersion being "supersaturated" in [OH$^-$] ions.

13 Claims, No Drawings

PREPARING STORAGE STABLE AQUEOUS COLLOIDAL DISPERSIONS OF CERIUM (IV) VALUES

CROSS-REFERENCE TO RELATED APPLICATIONS

This application is a continuation of application Ser. No. 07/342,680, filed Apr. 25, 1989, which is a continuation of application Ser. No. 06/876,449, filed Jun. 20, 1986, both now abandoned.

BACKGROUND OF THE INVENTION

1. Field of the Invention

The present invention relates to novel aqueous colloidal dispersions of a compound of cerium (IV), supersaturated in $OH^-$ ions, and to a process for the production thereof.

2. Description of the Prior Art

It is known to this art, from Kirk-Othmer, *Encyclopedia of Chemical Technology*, 2nd Edition, Vol. 4, pg. 850, that it is possible to prepare a hydrated ceric dioxide corresponding to the formula $CeO_2 \cdot x\, H_2O$, wherein x is a number ranging from 0.5 to 2, and in the form of a gelatinous precipitate, by the addition of sodium or ammonium hydroxide to solutions of ceric salts.

In French Patent No. 2,416,867 a process for the preparation of aqueous dispersions of cerium oxide is described, which process consists of formulating a suspension of cerium (IV) hydroxide with water and an acid capable of effecting the disintegration of the crystallites, and then heating the suspension for a period of time and at a temperature such that the pH attains a stable value, with the amount of the acid present in the suspension being such that said stable pH value is less than 5.4, and thereby producing a treated suspension into which water is incorporated to constitute an aqueous dispersion of cerium oxide.

It is noted in this '867 patent that the preparation of the hydrated cerium (IV) oxide may be carried out by the precipitation of a cerium salt. It is thus possible, for example, to dissolve a high purity cerous carbonate in a solution of nitric or hydrochloric acid, to obtain a neutral solution of cerous nitrate or chlorate, which is oxidized with $NH_4OH/H_2O_2$ to provide hydrated cerium (IV) oxide.

SUMMARY OF THE INVENTION

A major object of the present invention is the provision of novel colloidal dispersions of cerium (IV), in an aqueous medium, from an aqueous solution of a cerium (IV) salt, while at the same time avoiding the necessity for stages of precipitation and separation of the ceric hydroxide and any post-treatment thereof.

The present invention thus features novel aqueous colloidal dispersions of compounds of cerium (IV) which are supersaturated in $OH^-$ ions.

DETAILED DESCRIPTION OF THE PREFERRED EMBODIMENTS OF THE INVENTION

More particularly according to the present invention, and recognizing that the solubility product of ceric hydroxide is equal to $10^{-50}$, it is possible to define, as a function of concentration, a pH range wherein the ceric hydroxide is stable in the form of a solid precipitate.

It has now surprisingly been determined that it is possible to provide cerium (IV) in the form of a colloidal dispersion within a pH range wherein it would have been expected that the cerium (IV) would be present in the form of a ceric hydroxide precipitate.

One advantage of this invention is that the aqueous colloidal dispersions of cerium (IV) compounds have a very high proportion of cerium in the colloidal form, up to 100%.

Another advantage of the invention is that said dispersions are stable at ambient temperature and even at elevated temperatures of up to 100° C.

Finally, still another advantage is that said colloidal dispersions have characteristic low acidity (pH less than approximately 3).

The subject dispersions having the aforedescribed characteristics are obtained by reacting an aqueous solution of a salt of cerium (IV) with a base reactant such as to provide a degree of supersaturation of greater than 3 and less than 4.

Before more particularly defining the "degree of supersaturation", a more precise description of the nature of the various reagents/reactants will now be given.

The cerium salt used in the process of the invention is advantageously an aqueous solution of ceric nitrate or an aqueous solution of cerium-ammonium nitrate. The solution may contain, without imparting disadvantage, cerium in the cerous state, but it is desirable that it contain at least 85% of cerium (IV).

The solution of the cerium salt is selected such that it will not contain impurities that may be transferred into the final product. In particular, it is preferable that it be devoid of covalent anions that are coagulating in nature, such as sulfates, and the like. However, small amounts may be tolerated. For example, the said anions may constitute up to 5% by weight of the cerium salt, expressed as $CeO_2$.

The concentration of the solution of the cerium salt is not critical according to the invention. Expressed as cerium (IV) values, it may vary from 0.1 to 3 moles per liter. A concentration of from 0.1 to 1.5 moles per liter is preferred.

The aqueous solution of the cerium (IV) salt typically has a certain initial acidity and may exhibit a normality of from 0.1 N to 4 N. The concentration in $H^+$ ions is not critical. It is preferable that it range from 0.1 N to 1 N.

The ceric nitrate solution obtained via the electrolytic oxidation of a cerous nitrate solution, as described in published French Application No. 2,570,087 (No. 84/13641), is a most preferred material.

The basic solution, or base reactant according to the invention is advantageously an aqueous solution of ammonium, sodium or potassium hydroxide. Gaseous ammonia may also be used. In a preferred embodiment of the invention, an ammonium solution is used.

The normality of the basic solution is also not critical according to the invention. It may vary over a wide range, for example, from 0.1 to 11N, but it is preferable, in order to obtain concentrated cerium (IV) solutions, to first use a solution, the concentration of which varies from 5 to 11 N and thereafter a more dilute solution, for example, from 0.1 to 5 N.

The ratio between the basic solution and the cerium (IV) salt solution should be such that the degree of supersaturation is greater than 3 and less than 4.

The degree of supersaturation r is defined by the following equation:

$$r = (n3 - n2)/n1$$

wherein:
n1 is the number of moles of Ce (IV) values present in the final colloidal dispersion;
n2 is the number of moles of OH⁻ necessary to neutralize the acidity introduced via the aqueous solution of the cerium (IV) salt; and
n3 represents the total number of moles of OH⁻ introduced by the addition of the base.

The degree of supersaturation reflects the colloidal state of the cerium (IV) values:
with r=4, the cerium (IV) precipitates in a gelatinous form;
with r=0, the cerium (IV) is in the ionic form; and
with 0<r<4.0, the cerium (IV) is in the ionic and/or colloidal form.

It has now unexpectedly been determined that the provision of a colloidal dispersion of a cerium (IV) compound from the aforementioned two reagents is linked to two parameters, i.e., the degree of supersaturation and the final concentration of cerium (IV) values in the dispersion.

According to the invention, a degree of super-saturation greater than 3 and less than or equal to 3.8 is advantageously utilized to provide a final cerium (IV) concentration in the resulting colloidal dispersion of from 0.1 M (or 17 g/l CeO₂) to 2 M (or 344 g/l CeO₂). Preferably, the degree of supersaturation is greater than or equal to 3.4 and less than or equal to 3.8 to provide a final cerium (IV) concentration in the ultimate dispersion varying from 0.5 M (or 86 g/l CeO₂) to 1.2 M (or 206 g/l).

In a practical manner, in order to provide a degree r, of "supersaturation" within the aforenoted range for a given final Ce (IV) concentration in the ultimate colloidal dispersion, the concentration of the basic solution is adjusted such that is satisfies the following equation:

$$[OH^-] = \frac{(n_1 \cdot r + n_2) \ [Ce(IV)]_f [Ce(IV)]_i}{n_1 \ ([Ce(IV)]_i - [Ce(IV)]_f)}$$

wherein:
[OH⁻] represents the concentration in moles/liter of the basic solution;
[Ce (IV)]$_f$ represents the concentration in moles/liter of the product colloidal dispersion;
[CE (IV)]$_i$ represents the Ce (IV) concentration in moles/liter of the aqueous solution of the cerium (IV) salt; and
n₁ and n₂ are determined by conventional analysis of the aqueous solution of the cerium (IV) salt:
n₁ by potentiometric titration with the aid of a solution of a ferrous salt, and
n₂ by acid basic titration after complexing of the cerium with the aid of oxalate ions.

It is possible to relate, to a given degree of supersaturation, a quantity of the base introduced, expressed as a molar percentage of the quantity of the base theoretically required for the complete neutralization of the cerium (IV) present in the reaction medium, to obtain Ce(OH)₄.

A molar amount of base introduced, greater than 75% and less than 100% of the theoretical amount, corresponds to a degree of supersaturation greater than 3 and less than 4.

Exemplary of the above, it is noted that molar amounts of the base introduced of 87.5 and 95% of theoretical respectively correspond to degrees of supersaturation of 3.5 and 3.8.

A preferred embodiment of the invention comprises providing the degree of supersaturation by controlling the pH of the reaction medium.

A degree of supersaturation of less than 4 corresponds to a final pH of the colloidal dispersion of the cerium (IV) compound of less than or equal to 3.0. The pH varies from 0.3 to 3.0 for a degree of supersaturation greater than 3 and less than 4.

Without intending to limit the scope of the invention, it is noted as exemplary that, in the instance of a ceric nitrate solution having a concentration such that the final concentration of Ce (IV) in the product colloidal dispersion is 0.7 M, the following degrees of supersaturation are obtained, corresponding respectively to the pH ranges given below:

$$0.2 < pH < 0.7 \quad 3 < r < 3.3$$
$$0.7 < pH < 2.7 \quad 3.3 < r < 3.7$$

The reaction between the aqueous solution of the cerium (IV) salt and the base reactant, employed in the aforesaid amounts, is carried out at a temperature that may range from 0° C. to 60° C., but preferably at ambient temperature (most frequently 15° C. to 25° C.).

The mixture of the aforesaid reagents may be carried out according to any one of a number of different procedures. For example, the admixture of the aqueous solution of the cerium (IV) salt and the basic solution may be carried out simultaneously under agitation, or the base may be continuously added, or batchwise, to the aqueous solution of the cerium (IV) salt, or vice versa.

Preferably, a concentrated basic solution is added until a degree of supersaturation of 3.3, corresponding to a pH of 0.6, is obtained. Subsequently, the final pH desired is attained utilizing a more dilute basic solution.

The duration of mixing is also not critical and depends upon the capacity of the apparatus used for the operation. It typically varies from 0.1 second to 30 hours.

Whatever the order of the introduction of the reagents, a colloidal dispersion of a compound of cerium (IV) in an aqueous medium is obtained, hereinafter referred to as a "sol".

According to the present invention, the cerium (IV) compound is in the form of a colloidal dispersion in water, which signifies that the compound is in the form of particulates having colloidal dimensions, but this does not exclude the presence of Ce (IV) in the ionic form. It should be noted that the percentage of Ce (IV) in the colloidal form may be correlated, to a greater or lesser extent, with the degree of supersaturation. However, essentially all of the cerium (IV) is in the colloidal form, as r ranges from 3.4 to 3.8.

The chemical composition of the colloids is determined from the residue obtained after the ultracentrifugation of the dispersion, by analysis of cerium (IV) via the aforementioned technique and by the analysis of nitrate ions via the acid/base titration of the NH₄⁺ ions obtained following reduction of the nitrate ions.

However, the presence of ammonium ions adsorbed onto the colloidal particles may also be detected.

X-ray diffraction analysis of the solid residue evidences that it is a poorly crystallized material comprising a crystalline $CeO_2$ phase of the fluorine type, i.e., a face-centered cubic type having a lattice parameter of approximately 5.42 Å and a crystalline proportion varying from 15 to 40%.

The aqueous sol obtained according to the invention may comprise a high concentration of the cerium (IV) compound, up to approximately 30% by weight of $CeO_2$.

The product aqueous sol may have an appreciable ionic strength in view of the strong concentration of the basic salt, which may range from 0.3 to 8.0 moles/liter.

The density of the colloids is measured in the colloidal dispersion by determining the molecular weight by means of the conventional light diffusion method and by correlation with the hydrodynamic diameter defined by the method of quasi-elastic diffusion of light.

The density of the colloids is always less than that of $CeO_2$ (d=7.2). It varies from 3.5 to 6.0 and increases with rising degrees of supersaturation.

The size of the colloids is defined by measuring the hydrodynamic diameter of the colloids, determined by the quasi-elastic diffusion of light according to the method described by Michael L. McConnell in *Analytical Chemistry*, Vol. 53, No. 8, 1007 A (1981).

It depends upon the cerium (IV) concentration and the degree of supersaturation.

For a concentration of cerium (IV) of from 0.1 M to 2 M and a degree of supersaturation varying from 3 to 3.8, the hydrodynamic diameter of the colloids ranges from 50 to 400 Å.

It is noted that the sols obtained according to the process of the invention are perfectly stable under the usual conditions of storage, which is clearly shown in the examples to follow.

Thus, the present invention also features mixed aqueous colloidal dispersions of a cerium (IV) compound and another metallic cation $M^{n+}$, wherein n+ signifies the degree of oxidation of the metal and is generally equal to +3 or +4.

Exemplary of the "other" metallic cations, which shall be referred to generally as cations of the metal M, representative are cations of a metal selected from Groups 1b, 2b, 3b, 4b, 5b, 6b, 7b, the Group 8 and Groups 3a and 4a of the Periodic Table as set forth in the *Handbook of Chemistry and Physics B-4* (57th Edition).

Preferably, a metallic cation is selected which is acidic in character.

A cation which is acidic in character is defined as a cation, the hydroxide of which precipitates at low pH values, preferably at a pH of less than 4. Exemplary of such acidic cations, preferred are those of the metals iron, titanium, zirconium and tin.

0.1 to 50% of the moles of cerium (IV) may be replaced by the acidic metallic Cations described above.

The process for preparing the mixed aqueous colloidal dispersions of compounds of cerium (IV) and an $M^{n+}$ cation is similar to the process for preparing a colloidal dispersion of a cerium (IV) compound alone.

According to the invention, an aqueous solution of a cerium (IV) salt and a salt of the metal M are reacted with a base such as to provide a degree of supersaturation, expressed with respect to the cerium (IV) values, of greater than 3 and less than 5.5.

The amount of base added, expressed as a molar percentage of the amount of base theoretically required to completely neutralize the cerium (IV) and the cation $M^{n+}$ present in the reaction medium, to obtain $Ce(OH)_4$ and $M(OH)_n$ may vary from 60 to 95%.

In actual practice, providing such degree of supersaturation corresponds to a final pH of the mixed colloidal dispersion of less than or equal to 3.0.

The characteristics of the reagents and the conditions for the utilization thereof are those described above.

The metal M is preferably in the same form as the cerium salt. It is preferably employed as the nitrate thereof.

The salt of the metal M may be used in either the anhydrous or hydrated state.

It may also be used in the solid form, or as an aqueous solution, the concentration of which may vary from 0.01 mole/liter to the maximum solubility of the salt of the metal M.

A practical embodiment of the invention includes introducing the metal M in the solid form into the solution of the cerium (IV) salt, and then adding the base.

The salt of the metal M may also be in the form of an aqueous solution, then mixed with the aqueous solution of the cerium (IV) salt and the base subsequently added thereto.

A colloidal dispersion of a cerium (IV) compound and a cation of metal $M^{n+}$ in an aqueous medium is produced consistent herewith, and which may have high concentrations of the cerium (IV) compound and the metal M, containing up to 30% by weight of $CeO_2$ and $M_2O_n$.

The hydrodynamic diameter of these colloids, as determined by the aforesaid technique, may vary from 50 to 2000 Å.

In order to further illustrate the present invention and the advantages thereof, the following specific examples are given, it being understood that same are intended only as illustrative and in nowise limitative. In Example 1, the preparation of a colloidal dispersion by the $OH^-$ ion supersaturation of a ceric nitrate solution is illustrated.

EXAMPLE 1

Into a 6 liter three-necked flask equipped with a thermometer, an agitator, and a system for the introduction of reagents (metering pump), 2000 cm³ of a ceric nitrate solution were introduced at ambient temperature containing 1.2 moles/liter of cerium (IV), 0.04 mole/liter cerium (III) and having a free acidity of 0.5 N (prepared by electrolysis according to French Application No. 2,570,087).

To this solution, maintained under agitation, a first concentrated 6.6 N aqueous ammonia solution was added at a rate of 100 cm³/hr, at ambient temperature and gradually over a period of time of 13.7 hours.

The addition of the $OH^-$ ions by means of a 2.4 N ammonia solution was then continued over 5 hours, at a rate of 100 cm³/hr.

An aqueous colloidal solution of a cerium (IV) compound having a concentration, expressed as $CeO_2$, equal to 107 g/l and a pH of 2.67, was obtained.

The percentage of the cerium in colloidal form was determined by analyzing the total cerium content in the supernatant solution obtained after ultracentrifugation (45,000 rpm—1 hour) by potentiometric titration with the aid of a titer solution of Fe (II). The analysis of the supernatant solution for cerium showed a very low concentration of total cerium, on the order of 0.2 mole, which made it possible to determine a percentage of cerium in the colloidal form in the supersaturated dispersion of close to 100%.

The size of the colloids was determined by the quasi-elastic diffusion of light, as described by Michael L. McConnell in *Analytical Chemistry*, Vol. 53, No. 8, 1007 A (1981). The hydrodynamic diameter of the colloids was on the order of 147 Å.

It is noted that the sol obtained had good stability in storage and exhibits no sedimentation after at least one year in storage.

In the following example, a mixed colloidal dispersion was prepared by the supersaturation of an aqueous solution of ceric nitrate and ferric nitrate.

EXAMPLE 2

Into the type of apparatus described in Example 1, at ambient temperature, 1744 cm$^3$ of a ceric nitrate solution were introduced, containing 1.2 moles/liter cerium (IV), 0.04 mole/liter cerium (III) and having a free acidity of 0.5 N, together with 86.15 g ferric nitrate Fe(NO$_3$)$_3$. 9 H$_2$O (98% purity).

To this mixture, which was maintained under agitation, 1256 cm$^3$ of a concentrated 6.19 N aqueous ammonia solution were added at ambient temperature at a rate of 100 cm$^3$/h, followed by the addition of 100 cm$^3$ of a 2.48 N ammonia solution.

An aqueous colloidal dispersion having a CeO$_2$ concentration on the order of 116.13 g/l and a pH of 1.5, was obtained.

Analysis of an aliquot fraction (290 cm$^3$) by quasi-elastic light diffusion showed the presence of two colloid populations respectively having a hydrodynamic diameter of 76 Å and 199 Å.

By continuing the addition of the 2.48 N ammonia solution for 66 minutes, an aqueous colloidal dispersion having a CeO$_2$ concentration of 111.7 g/l and a pH of 2 was obtained.

In a sample of 240 cm$^3$, two colloidal populations identified by their respective hydrodynamic diameters of 167 Å and 977 Å were found.

The amount of base added in this manner to the reaction medium represented 84 molar % of the theoretical amount required for the complete neutralization of the cerium and the iron present in the reaction medium (OH$^-$/Fe$^{3+}$ = 3 and OH$^-$/Ce$^{4+}$ = 4).

The chemical composition of the species present in the colloidal form in the aqueous sol was determined by X-ray fluorescence analysis of the solid residue obtained by ultracentrifugation (45,000 rpm, 1 hr) after drying and calcination at 1,000° C. for 2 hr.

The molar ratio Fe/Ce, determined comparatively in samples with defined Fe/Ce compositions, showed a value on the order of 0.1.

The following examples illustrate the preparation of a mixed colloidal dispersion by OH$^-$ ion supersaturation of a mixed ceric nitrate and zirconyl nitrate solution.

EXAMPLE 3

55.85 g of zirconyl nitrate (ZrO(NO$_3$)$_2$. 2 H$_2$), were added to 1744 cm$^3$ of a ceric nitrate solution containing 1.2 moles/liter of cerium (IV), 0.04 mole/liter cerium (III) and having a free acidity of 0.5 N.

To this mixture, which was maintained under agitation, 1256 cm$^3$ of an 6.19 N ammonia solution were added at ambient temperature at a rate of 100 cm$^3$/hr, followed by 165 cm$^3$ of a 2.48 N ammonia solution at the same rate.

An aqueous colloidal dispersion having a CeO$_2$ concentration on the order of 113.7 g/l and a pH of approximately 1.57 was obtained.

Examination of an aliquot fraction (250 cm$^3$) by quasi-elastic light diffusion made it possible to determine a hydrodynamic diameter of the colloids on the order of 121 Å.

The addition of the 2.48 N ammonia solution was continued for an additional 40 cm$^3$.

The amount of the base added in this manner to the reaction medium represented 80 molar % of the theoretical amount necessary for the complete neutralization of the cerium and zirconium present in the reaction medium (OH$^-$/Zr$^{4+}$ = 4 and OH$^-$/Ce$^{4+}$ = 4).

An aqueous colloidal dispersion having a CeO$_2$ concentration on the order of 112 g/l and a pH of 2.58, was obtained.

The hydrodynamic diameter of the colloids measured by the diffusion of light was 490 Å.

The chemical composition of the species present in the colloidal form in the aqueous sol was determined as above.

The molar ratio Zr/Ce was on the order of 0.1.

EXAMPLE 4

320.7 g of zirconyl nitrate, ZrO(NO$_3$)$_2$. 2H$_2$O, were added to 1000 cm$^3$ of a ceric acid solution containing 1.2 moles/liter of cerium (IV), 0.04 mole/liter cerium (III) and having a free acidity of 0.5N; the molar ratio Zr$^{4+}$/Ce$^{4+}$ was 1.

To this mixture, maintained under agitation, 650 cm$^3$ of a 6.9 N aqeuous ammonia solution were added at ambient temperature, at a rate of 100 cm$^3$/hr, followed by 1016 cm$^3$ of a 2.425 N ammonia solution at the same rate.

The amount of the base added in this manner to the reaction medium represented 67 molar % of the theoretical amount necessary for the complete neutralization of the cerium and zirconium present in the reaction medium (OH$^-$/Zr$^{4+}$ = 4 and OH$^-$/Ce$^{4+}$ = 4).

An aqueous colloidal dispersion having a concentration in CeO$_2$ on the order of 77.4 g/l and a pH of approximately 2, was obtained.

Examination of an aliquot fraction (250 cm$^3$) by quasi-elastic light diffusion made it possible to determine a hydrodynamic diameter of the colloids on the order of 350 Å.

The molar ratio Zr/Ce determined was on the order of 0.65.

EXAMPLE 5

139.6 g of zirconyl nitrate, ZrO(NO$_3$)$_2$. 2 H$_2$O, were added to 1744 cm$^3$ of a ceric nitrate solution containing 1.2 moles/liter of cerium (IV), 1.2 moles/liter cerium (III) and having a free acidity of 0.5 N; the molar ratio Zr$^{4+}$/Ce$^{4+}$ was 0.25.

To this mixture, which was maintained under agitation, 1256 cm$^3$ of a 6.19 N aqueous ammonia solution were added at ambient temperature at a rate of 100 cm$^3$/hr, followed by 696 cm$^3$ of a 2.4 ammonia solution at the same rate.

The amount of the base added in this manner to the reaction medium represented 82% of the theoretical amount necessary for the complete neutralization of the cerium and necessary for the complete neutralization of the cerium and zirconium present in the reaction medium (OH$^-$/Zr$^{4+}$ = 4 and OH$^-$/Ce$^{4+}$ = 4).

An aqueous colloidal dispersion having a $CeO_2$ concentration on the order of 97 g/l and a pH of approximately 2.6, was obtained.

Analysis of the supernatant solution for cerium showed a very low total cerium concentration on the order of 3.5 g/l, which made it possible to determine the percentage of cerium in the colloidal form in the supersaturated dispersion of approximately 96%.

The chemical composition of the species present in the colloidal form in the aqueous sol was determined as above.

The molar ratio Zr/Ce determined was on the order of 0.13.

While the invention has been described in terms of various preferred embodiments, the skilled artisan will appreciate the various modifications, substitutions, omissions, and changes may be made without departing from the spirit thereof. Accordingly, it is intended that the scope of the present invention be limited solely by the scope of the following claims.

What is claimed is:

1. A process for the preparation of a storage-stable aqueous sol, comprising reacting an aqueous solution of a cerium (IV) salt with a base reactant, in such respective amounts as to provide a colloidal dispersion of Ce(IV) values in an aqueous medium, said Ce(IV) values being an ionic and/or colloidal combination of cerium with hydroxide and nitrate, and with said colloidal dispersion of Ce(IV) values in an aqueous medium having an r-value of greater than 3 but less than 4, wherein:

$$r = (n3 - n2)/n1$$

wherein:
n1 is the number of moles of Ce(IV) values present in the final colloidal dispersion;
n2 is the number of moles of $OH^-$ necessary to neutralize the acidity introduced via the aqueous solution of the cerium (IV) salt; and
n3 is the total number of moles of $OH^-$ introduced by the addition of the base.

2. The process as defined by claim 1, wherein the solution of the cerium (IV) salt comprises an aqueous solution of ceric nitrate or an aqueous solution of cerium-ammonium nitrate.

3. The process as defined by claim 2, wherein the cerium (IV) salt concentration, expressed as Ce (IV) values, ranges from 0.1 to 3 moles/liter.

4. The process as defined by claim 3, wherein the concentration of the cerium (IV) salt, expressed as cerium (IV) values, ranges from 0.1 to 1.5 moles/liter.

5. The process as defined by claim 1, wherein the base reactant comprises an aqueous solution of ammonium, sodium or potassium hydroxide, or gaseous ammonia.

6. The process as defined by claim 5, wherein the normality of the base solution ranges from 5 to 11 N.

7. The process as defined by claim 6, wherein the normality of the base solution ranges from 0.1 to 5 N.

8. The process as defined by claim 1, said r-value ranging from 3 to 3.8.

9. The process as defined by claim 8, said r-value ranging from 3.4 to 3.8.

10. The process as defined by claim 1, wherein the temperature of the reaction between the aqueous solution of the cerium (IV) salt and the base reactant ranges from 0° C. to 60° C.

11. The process as defined by claim 10, said reaction temperature being ambient temperature.

12. The process as defined by claim 1, wherein the aqueous solution of the cerium (IV) salt and the base reactant are mixed simultaneously under agitation, or the base reactant is added to the cerium (IV) solution, or conversely.

13. A process for the preparation of a mixed storage-stable aqueous sol, comprising reacting an aqueous solution of a cerium (IV) salt and a metal M salt with a base reactant, in such respective amounts as to provide a colloidal dispersion of Ce(IV) values in an aqueous medium, said Ce(IV) values being an ionic and/or colloidal combination of cerium with hydroxide and nitrate, said dispersion further comprising colloidal particulates of a cation of metal M, said metal M being a metal of Group 1b, 2b, 3b, 4b, 5b, 6b, 7b, 8, 3a or 4a of the Periodic Table, and with said colloidal dispersion of Ce(IV) values in an aqueous medium having an r-value of greater than 3 and less than 5.5, wherein:

$$r = (n3 - n2)/n1$$

wherein:
n1 is the number of moles of Ce(IV) values present in the final colloidal dispersion;
n2 is the number of moles of $OH^-$ necessary to neutralize the acidity introduced via the aqueous solution of the cerium (IV) salt; and
n3 is the total number of moles of $OH^-$ introduced by the addition of the base.

* * * * *